(12) United States Patent
Chaghazardi et al.

(10) Patent No.: US 12,494,002 B2
(45) Date of Patent: Dec. 9, 2025

(54) SYNTHETIC TABLE GENERATION PIPELINE FOR TRAINING DEEP TABLE EXTRACTION MODELS

(71) Applicant: Oracle International Corporation, Redwood Shores, CA (US)

(72) Inventors: Mohammadhossein Chaghazardi, Boston, MA (US); Wenjing Yang, Edmonds, WA (US); Tao Sheng, Bellevue, WA (US); Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 172 days.

(21) Appl. No.: 18/467,291

(22) Filed: Sep. 14, 2023

(65) Prior Publication Data
US 2024/0273789 A1    Aug. 15, 2024

Related U.S. Application Data

(60) Provisional application No. 63/445,230, filed on Feb. 13, 2023.

(51) Int. Cl.
*G06T 11/20* (2006.01)
*G06T 7/90* (2017.01)

(52) U.S. Cl.
CPC ............. *G06T 11/206* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 10,546,054 B1 | 1/2020 | Foroughi et al. | |
| 11,087,081 B1 | 8/2021 | Srivastava et al. | |
| 2024/0071115 A1* | 2/2024 | Kim | G06T 5/77 |
| 2024/0355134 A1* | 10/2024 | Huang | G06V 30/412 |

OTHER PUBLICATIONS

"AI Vision", Available at: https://www.oracle.com/in/artificial-intelligence/vision/#rc30p2, 1 page.

(Continued)

*Primary Examiner* — Jeffrey J Chow
(74) *Attorney, Agent, or Firm* — Kilpatrick Townsend & Stockton LLP

(57) ABSTRACT

Techniques are described for HTML-based image generation. An example, method can include generating hypertext markup language (HTML) code for a table comprising a table structure of a set of rows and columns. The method can further include generating HTML code for a text to populate a cell of the table. The method can further include generating a rendered image of the table using the HTML code. The method can further include detecting a first pixel of the rendered image comprising the first color, and a second pixel of the rendered image comprising the second color. The method can further include detecting the text on the rendered image. The method can further include generating a bounding box, surrounding the detected text. The method can further include generating annotation comprising a bounding box parameter and a text parameter.

20 Claims, 16 Drawing Sheets

(56) References Cited

OTHER PUBLICATIONS

"Document AI", Available at: https://cloud.google.com/document-ai, 2022, 3 pages.
"Form Recognizer Layout Model", Available at: https://learn.microsoft.com/en-us/azure/applied-ai-services/form-recognizer/concept-layout?view=form-recog-3.0.0, Oct. 12, 2022, 9 pages.
"Handling the Processing Response", Available at: https://cloud.google.com/document-ai/docs/handle-response, 6 pages.
"Item Location on a Document Page", Available at: https://docs.aws.amazon.com/textract/latest/dg/text-location.html, 2022, 5 pages.
"Synthetic Invoice Dataset Generator", Available at: https://provectus.com/wpcontent/uploads/2021/11/synthetic_compressed.pdf, 2021, 6 pages.
"What is Amazon Textract?", Available at: https://docs.aws.amazon.com/textract/latest/dg/what-is.html, 2022, 2 pages.
Nassar et al., "TableFormer: Table Structure Understanding with Transformers", Available at: https://openaccess.thecvf.com/content/CVPR2022/papers/Nassar_TableFormer_Table_Structure_Understanding_With_Transformers_CVPR_2022_paper.pdf, pp. 4614-4623.
Paliwal et al., "Tablenet: Deep Learning Model for End-to-end Table Detection and Tabular Data Extraction From Scanned Document Images", Available at: https://arxiv.org/pdf/2001.01469v1.pdf, Jan. 6, 2020.
Sun et al., "Enhanced Table Extraction from documents with Form Recognizer", Available at: ttps://techcommunity.microsoft.com/t5/ai-cognitive-services-blog/enhanced-table-extraction-from-documents-with-form-recognizer/ba-p/2058011, Jan. 14, 2021, 4 pages.
Zhao et al., "CTAB-GAN: Effective Table Data Synthesizing", Available at: https://arxiv.org/pdf/2102.08369.pdf, May 31, 2021, 11 pages.

* cited by examiner

FIG. 7

INVOICE

INVOICE TO
Mr. Jonathon Doe
69, Canada Square Road
London E15 LB 5434
008-123-456789
jonathon@email.com Invoice No : 01234
Date : 30.10.2015
Due Date : 10.11.2015
Account No : 00000123

806 — LFmKENSKF FUSLI GFDGFHHmT — 808

SYNTHETIC TABLE GENERATION PIPELINE FOR TRAINING DEEP TABLE EXTRACTION MODELS

CROSS-REFERENCE TO RELATED APPLICATIONS

This application is claims the benefit of U.S. Provisional Application No. 63/445,230, filed on Feb. 13, 2023, which is incorporated by reference.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

One service that a CSP can provide is a computer vision service for analyzing documents using a machine learning model. A machine learning model can receive training instances for use in training the machine learning model to identify particular objects in a document image. The accuracy of the machine learning model can be improved by a training process that includes large amounts of quality training data instances. One issue that can arise is that there can be a scarcity of quality training data instances to train the machine learning model. This issue can arise from poorly generated training instances, high costs to purchase quality training data instances, and governmental regulatory barriers that prevent the use of data for training purposes.

BRIEF SUMMARY

Embodiments described herein are directed toward HTML-based image generation. An example method can include a computing system generating hypertext markup language (HTML) code for generating a first image of a table. The HTML code can comprise a first text to populate a first cell of a plurality of cells of the table, and a first color associated with the first cell.

The method can further include the computing system generating the first image of the table comprising the first cell that is rendered using the first color, the first cell populated with the first text.

The method can further include the computing system detecting a first plurality of pixels of the first image comprising the first color.

The method can further include the computing device determining a first bounding box for the first cell that bounds the first plurality of pixels based at least in part on the first color.

The method can further include the computing device associating the first image with a first annotation that associates the first text with the first bounding box.

The method can further include the computing device generating a bounding box, surrounding the detected text.

The method can further include the computing device generating an annotation comprising a bounding box parameter and a text parameter.

Embodiments described herein are further directed toward a computing system including one or more processors; and one or more computer-readable media including instructions that, when executed by the one or more processors, cause the computing system to generate a first image of a table. The HTML code can comprise a first text to populate a first cell of a plurality of cells of the table, and a first color associated with the first cell.

The instructions that, when executed by the one or more processors, further cause the computing system to generate the first image of the table comprising the first cell that is rendered using the first color, the first cell populated with the first text.

The instructions that, when executed by the one or more processors, further cause the computing system to detect a first plurality of pixels of the first image comprising the first color.

The instructions that, when executed by the one or more processors, further cause the computing system to determine a first bounding box for the first cell that bounds the first plurality of pixels based at least in part on the first color.

The instructions that, when executed by the one or more processors, further cause the computing system to associate the first image with a first annotation that associates the first text with the first bounding box.

Embodiments described herein are further directed toward one or more non-transitory computer-readable media including stored thereon a sequence of instructions that, when executed by one or more processors, cause a computing system to generate a first image of a table. The HTML code can comprise a first text to populate a first cell of a plurality of cells of the table, and a first color associated with the first cell.

The instructions that, when executed by the one or more processors, further cause the computing system to generate the first image of the table comprising the first cell that is rendered using the first color, the first cell populated with the first text.

The instructions that, when executed by the one or more processors, further cause the computing system to detect a first plurality of pixels of the first image comprising the first color.

The instructions that, when executed by the one or more processors, further cause the computing system to determine a first bounding box for the first cell that bounds the first plurality of pixels based at least in part on the first color.

The instructions that, when executed by the one or more processors, further cause the computing system to associate the first image with a first annotation that associates the first text with the first bounding box.

BRIEF DESCRIPTION OF THE DRAWINGS

FIG. 7 is an illustration of an example cleaned image of a table, according to one or more embodiments.

FIG. 8 is an illustration of an example image with generated text and generated bounding boxes, according to one or more embodiments.

DETAILED DESCRIPTION

Figure 1:
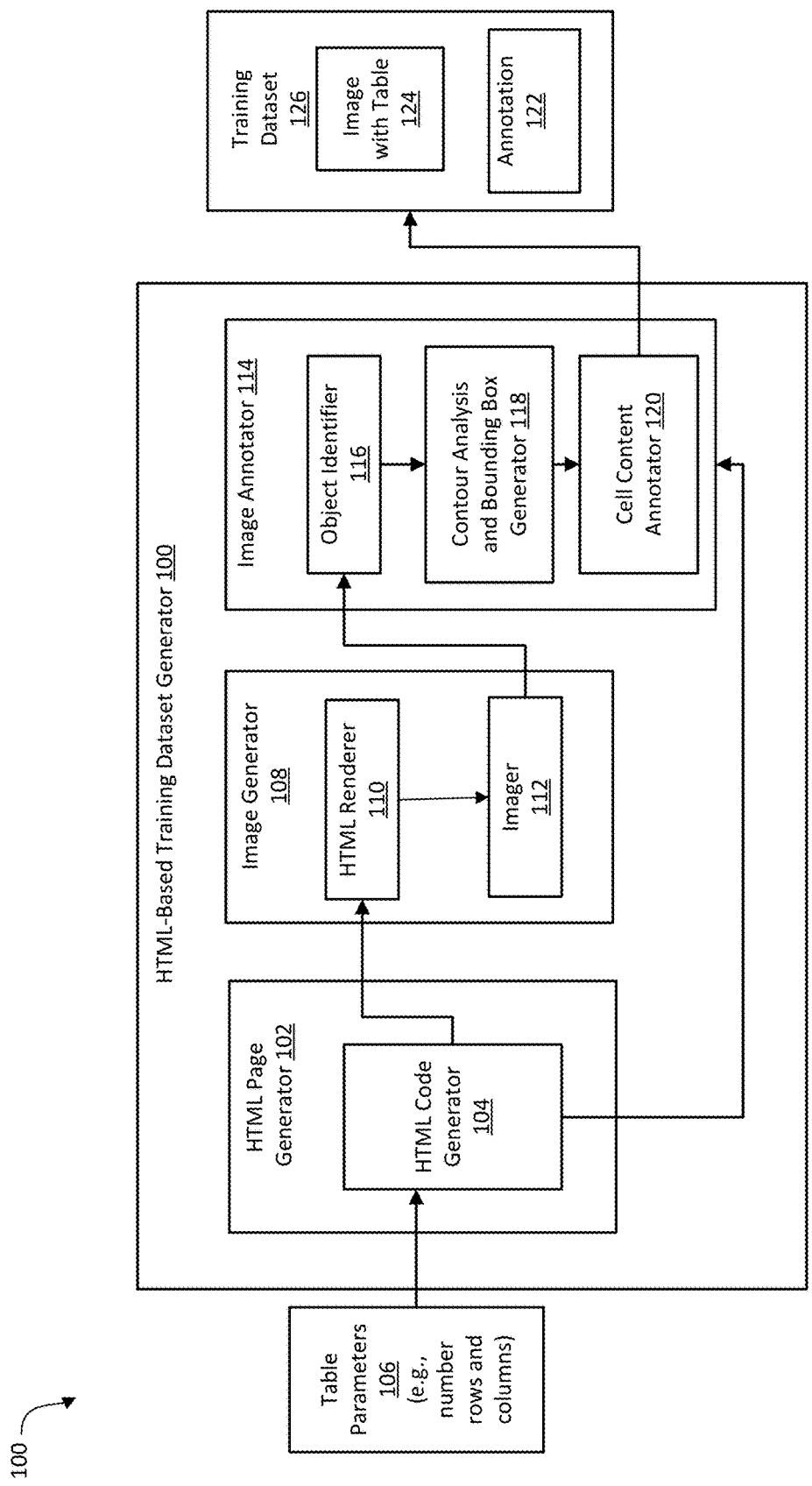
FIG. 1 is an illustration of a system for generating an annotated training instance, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud services provider (CSP) can offer computer vision services that use machine learning models to analyze images and identify elements included in those images. In some instances, the images can include textual content arranged in a structured format, such as a table. The table can be a bordered table, such that cells are delineated by visible borders. The table can also be a borderless table, in which there is no visible delineation between cells. Machine learning-based table recognition offers additional challenges than character recognition. A machine learning model can be tasked with analyzing an image that includes a table and needs to be able to not only determine the characters in each cell, but an overall arrangement of the table as well.

Embodiments described herein provide techniques for generating training instances for training a machine learning model for table recognition. The techniques can be used to generate a diverse set of training instances, that include different backgrounds, different table layouts (e.g., different numbers of columns and rows, different sized cells), different text (e.g., different strings of alphanumeric characters, different fonts, and different font sizes), and appear to originate from different sources.

The techniques can include two pipelines that can work independently from each other or together. The first pipeline can be a Hypertext Markup Language (HTML)-based pipeline that can include an HTML page generator to generate HTML code for a table. One or more cells of the table can include text, in which the textual alphanumeric characters are associated with a color, a font, and a font size. The HTML code can further include a location of each cell of the table. The text can include a random sequence of characters or actual recognizable words or numbers. The first pipeline can further include an image generator for using the HTML code to render an image of the table. The image can include a visual representation of a table in which one or more cells can include a respective text displayed in a desired color, a desired font, and a desired font size. In other words, if the table includes sixteen cells and twelve of the cells are populated with text, each respective text instance can be displayed in a unique color.

The first pipeline can further generate an annotation from the image. The annotation can include information on a respective bounding box surrounding each text instance and also include text information. The first pipeline can detect each text instance based on a distinction between the text color and a color of the background. For example, the first pipeline can approximate a bounding box enclosing the text. The first pipeline can further determine a spatial location of the bounding box in relation to a coordinate system of the image.

As indicated above, the annotation can further include text information. The first pipeline can further a respective color for each text instance of the image. Once the pipeline determines the color of the text, the first pipeline can compare the determined color with a color identified in the HTML code. Once the first pipeline identifies a color in the HTML code, the first pipeline can access the HTML code to determine the text information associated with the color. The text information can include the text, the font, the color, the font size, and effects (e.g., bold, underline).

In some embodiments, the first pipeline can embed the image with the annotation. In another embodiment, the first pipeline can store the annotation separately from the image. The annotation and the image can be used as a training instance for a machine learning model. The first pipeline can repeat this process and be used to generate multiple training instances for a machine learning model.

The second pipeline can be a template-based pipeline for generating training instances. The second pipeline can be used in conjunction with the first pipeline or independently from the first pipeline. The second pipeline can receive a first input, such as an image of a table. The second pipeline can further receive a second input, including an annotation, which includes information (e.g., bounding box dimensions, bounding box spatial location) for a bounding box associated with a cell. In some instances, the first input includes a table with a vacant cell. In other instances, the first input includes a table with a cell populated with text. In these instances, the second pipeline can use image processing techniques to remove the text from the cell, such that the cell becomes vacant.

The second pipeline can generate a randomized text instance to populate a vacant cell of the table. The second pipeline can further use the bounding box information to constrain the randomized text. For example, the generated randomized text can be limited to text that fits inside the dimensions of the bounding box as described in the annotation. The randomized text can include a string of random alphanumeric characters or words and phrases.

The second pipeline can further overlay the randomized generated text onto the image. The placement of the text can be constrained by the spatial location of the bounding box, as described by the annotation. Once the text has been overlaid onto the image, the second pipeline can generate a new bounding box to surround the randomized text instance. The second pipeline can generate an annotation that includes information on the bounding box and text information. The image and the annotation can be used as a training instance for a machine learning model to be used for table extraction. The second pipeline can repeat this process and be used to generate multiple training instances for a machine learning model.

FIG. 1 is an illustration of an HTML-based training dataset generator 100 for generating an annotated training instance, according to one or more embodiments. The HTML-based training dataset generator 100 can include an HTML page generator 102. HTML can be a markup language that includes specific syntax, file, and naming conventions. HTML code can be used to provide information as to how an HTML page is to be displayed. The HTML page generator 102 can use an HTML code generator 104 to generate a body of HTML code for structuring data as a table, where a table can be a structure that includes rows and columns. The HTML code generator 104 can receive as an input, table parameters, such as a number of rows and columns) and generate HTML code based on those parameters. The code can include HTML elements, where each element includes a start tag, content, and an end tag. For example, the tag <td> can indicate that the content in the element is for a table data cell.

The HTML code generator 104 can generate code for a table, including text for one or more cells of the table. The HTML code can define a structured table that includes one or more cells populated with text. The cells can include header cells that describe an attribute of the contents of the data cells, and the data cells. For a cell that includes text, the HTML code generator 104 can generate code to cause the text to be displayed in particular parameters, such as color, font, font size, and effect. For example, consider a table, in which two cells include text. The first cell can include the text, "Steven drove to Canada." The second cell can include the text "120 miles from start to destination." The HTML code generator 104 can generate code to cause "Steven drove to Canada" to display in a first color (e.g., orange) and "120 miles from start to destination" to display in a second color (e.g., blue). The HTML page generator 102 can further generate code to cause the text in each cell to be displayed in a desired font, font size, and effect. For example, both "Steven drove to Canada" and "120 miles from start to destination" can be displayed in the same font and font size (e.g., both are displayed 11 point Calibri). In other instances, "Steven drove to Canada" and "120 miles from start to destination" can be displayed in different fonts and/or font sizes. For example, "Steven drove to Canada" can be displayed in one font and font size (e.g., 11 point Calibri), and "120 miles from start to destination" can be displayed in another font and font size (e.g., 12 point Times New Roman). The HTML code can further configure a cell background color and table background color to be distinct from each text color. The cell background color and the table background color may not necessarily be distinct to the human eye, but can be distinguished by a computing system.

The HTML code generator 104 can transmit an HTML file, including the code, to an image generator 108, and in particular, an HTML renderer 110. The HTML renderer 110 can generate an image file of the table using the HTML code. For example, the HTML renderer 110 can parse the code and arrange code elements into a data structure, such as a tree. The HTML renderer 110 can include an HTML parser. The HTML parser can parse the HTML code and arrange the HTML code elements into a data structure. The HTML renderer 110 can then arrange the HTML code elements into a combined data structure, such as a rendering tree. The HTML renderer 110 can transmit the combined data structure to an imager 112. The imager 112 can use the combined data structure to generate an image of the table. For example, the imager 112 can position the text to be displayed in a table format and then generate an image that includes the table and text.

The image generated by the image generator 108 can be transmitted to an image annotator 114, and in particular, an object identifier 116. The object identifier 116 can detect objects of interest for generating bounding boxes to surround the objects. The image can include multiple objects of interest, such as the text instances included in the cells of the table. However, it may not be initially ascertainable to the image annotator 114 that an object is text to be surrounded by a bounding box.

The object identifier 116 can analyze the image to detect a distinction in pixel colors. Various techniques can be used to detect the pixel color, for example, using a binary mask to mask out specific colors. The image can be a red, blue, green (RBG) image, where each pixel of the image can include a color defined by an RGB value. For example, each green pixel can be described by RGB value within a range of [45, 100, 50] to [75, 255, 255]. As described herein, the actual RGB value can be known based on the HTML code generated by the HTML code generator 104. The HTML code generator 104 can further transmit the identities the colors used in the HTML code for the text. In some instances, the object identifier 116 can further convert the RGB values from the RGB color space to another color space, such as a hue, saturation value (HSV) color space or a L*a*b* color space. In either case, as the object identifier 116 is provided the target colors by the HTML code generator 104, it can create respective masks for each target color. Each respective mask can be used to filter out pixels having values outside of a target color's range. For example, the object identifier 116 can target the color blue and generate a mask (e.g., a binary mask) that filters out all non-blue color values. Based on the filtering, the object identifier 116 can determine that blue pixels are present in the image. As the HTML code generator 104 has transmitted information that the HTML code includes code to display text in blue, the object identifier 116 can determine that the blue pixels are associated with a text instance. As the object identifier 116 has identified pixels on the image having a color associated with text, the object identifier 116 can further determine the location of the pixel on the image. The location can include coordinates in a coordinate system of the image, and later be used for bounding box generation. The location can further be within a cell of the table in the image.

The object identifier 116 can transmit the location of the pixel(s) to the contour analysis and bounding box generator 118. The contour analysis and bounding box generator 118 can detect a contour and consequently a boundary around a text character based on the contrast in pixel intensity between the text pixel color and the background pixel color. The contour can be a curve that joins a set of points around the boundary of the text. Upon determining the contour around each text character, contour analysis and bounding box generator 118 can group the characters together. For example, if the characters "Pro" and "Am" were detected and each of the characters were in the same color, each of the characters, "P," "r," and "o" can be grouped together. Furthermore, the characters "A" and "m," if in the same color, can be included in the group. The contour analysis and bounding box generator 118 can further generate a respective bounding box around the entire text instance (e.g., "Pro Am"). A bounding box can include a position defined by the x- and y-axis coordinates of the bounding box. In other embodiments, the bounding box can be defined by the x- and y-axis coordinates of the center of the bounding box, a length of the bounding box, and a width of the bounding box. The object identifier 116 can perform a similar operation for other target colors. It should be appreciated that the object identifier 116 may not recognize a semantic meaning of the text, rather a color of the text and a spatial position of the colored pixels on the image.

In some instances, the table has a uniform background color. For example, the entire background can be white. In these instances, the contrast can be between the text color and the background color. In other instances, a background color can be limited to a cell. For example, a first cell background is in red, and a second cell background color can be orange. In these instances, the text color can be uniform (e.g., all text is black), or the text can be different colors. For example, the first cell text color is black and the second cell text color is blue. In instances that each cell has a different background color and the text is in a uniform color, text detection can be performed based on cell background color detection, rather than text color detection. The object identifier 116 can receive the cell background color via the HTML code. The object identifier 116 can identify a cell background color, and then identify another pixel color within the contour of the cell color. As the cell should only include the text, the object identifier 116 can determine the other pixel color is the pixel color of the text. The object identifier 116 can then perform a second contour analysis to identify and group the text characters.

A cell content annotator 120 can generate an annotation for the image, including bounding box information and text information. The cell content annotator 120 can access the HTML code and compare each identified color in the image with the text color indicated in the HTML code. For example, the cell content annotator 120 can determine that the image includes text displayed in a purple color. The cell content annotator 120 can analyze the HTML code and determine which text is coded to be displayed in purple. The cell content annotator 120 can detect the text tags (e.g., <text> and </text>) to extract the text written in between the tags. The cell content annotator 120 can further detect the tags for color (e.g., <font color="00FF00"> and </font> to determine the color associated with the text. A similar process can be used to determine a cell background color. The cell content annotator 120 can further use the HTML code to determine additional information, such as font, font size, and effects.

The cell content annotator 120 can further generate an annotation 122 that includes information for the bounding box, including bounding box parameters (e.g., bounding box location and bounding box dimensions), table information (e.g., number of rows and columns) and text information (e.g., characters, fonts, and font sizes). The cell content annotator 120 can further associate the annotation 122 with the image with table 124 generated by the image generator 108 and create a training instance. The HTML-based training dataset generator 100 can further repeat this process to generate multiple training instances to form a training dataset 126.

Figure 2:
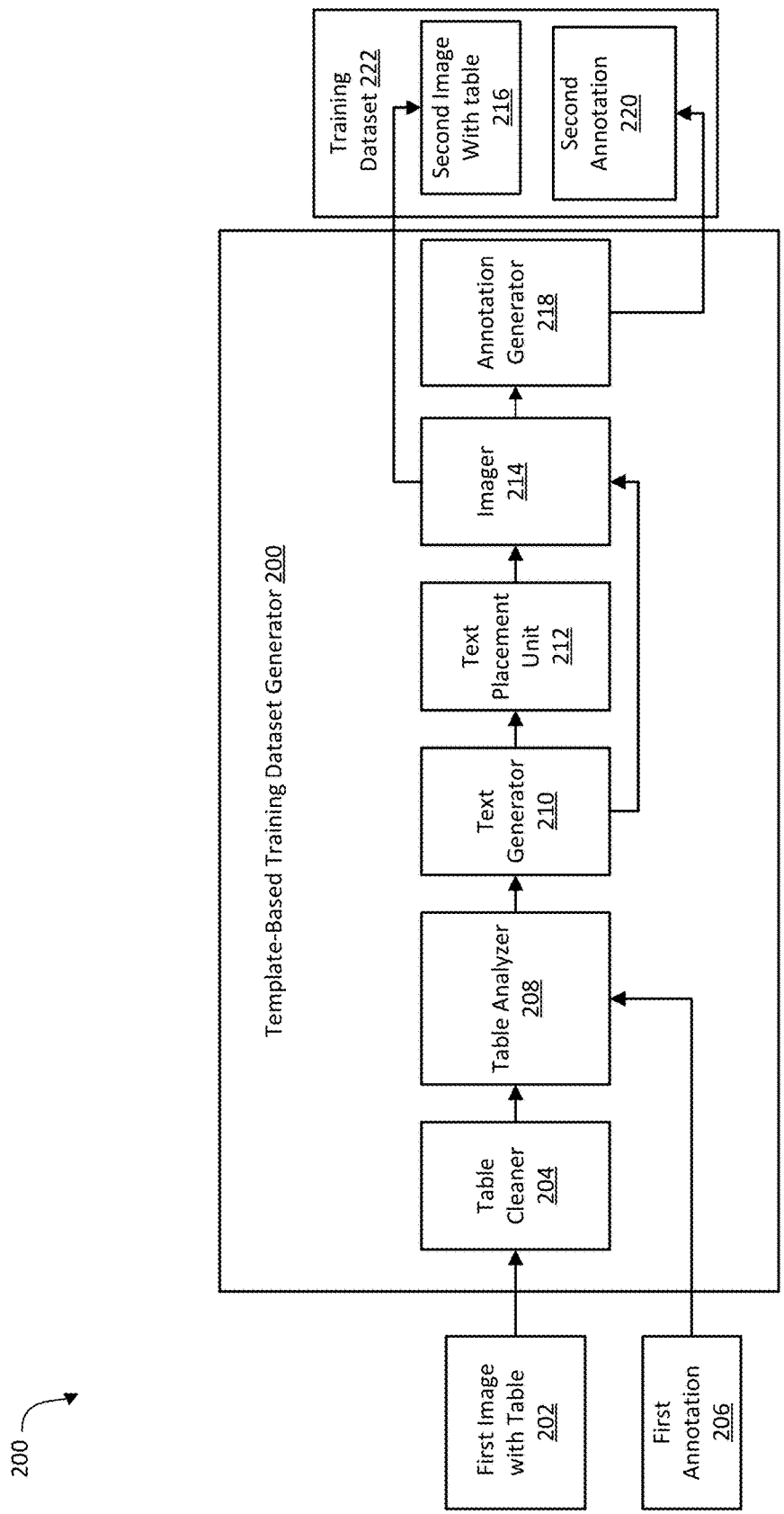
FIG. 2 is an illustration of a system for generating an annotated training instance, according to one or more embodiments.

FIG. 2 is an illustration of a template-based training dataset generator 200 for, according to one or more embodiments. The template-based training dataset generator 200 can be configured to receive a first input, including a first image with table 202. The image with table 202 can be in an image format, such as .jpg or .png. The image with table can be a cleaned image that includes a table of columns and rows, in which each cell is vacant. In other instances, the first image with table 202 can include text in at least one cell. For example, the first image with table 202 can be the image with table 124. In the event that a cell includes text, a table cleaner 204 can clean the first image with table 202 to remove the text in the cell.

The template-based training dataset generator 200 can further receive a second input, such as a first annotation 206, that includes bounding box parameters (e.g., bounding box location and bounding box dimensions). In some instances, the first annotation 206 can further include table information (number of rows and columns), and text information (e.g., characters, fonts, and font sizes). For example, the first annotation 206 can be the annotation 122. A table analyzer 208 can receive the first annotation 206 and determine whether table information is included. In the event that the first annotation 206 does not include table information, the table analyzer 208 can use computer vision techniques to determine the table information. For example, the table analyzer 208 can include a machine learning model that is trained to analyze the first image with table 202 and determine the table information.

The template-based training dataset generator 200 can further include a text generator 210 for generating randomized text to be included in the first image with table 202. The text can be randomized based on, for example, color, font, characters, and font size. The text can be overlayed on the cleaned image and the text parameters can be constrained by the parameters of the bounding box. The parameters can include, for example, the text, font, font size, and effects.

The text generator 210 can determine the parameters of the bounding box provided by the first annotation 206. As indicated above, the first annotation 206 can include coordinates for corners of the bounding box (e.g., coordinates for each corner, or coordinates for the upper left-hand corner and lower right-hand corner) or coordinates of the center of the bounding box, a length of the bounding box, and a width of the bounding box. The coordinates can be in a coordinate system of the first image with table 202. In the instance that the bounding box annotation includes the coordinates of the corners of the bounding box, the text generator 210 can use the coordinates to determine a length and a width of the bounding box, if not provided in the first annotation 206. The text generator 210 can further determine the area of the bounding box based on the length and width.

The text generator 210 can use the bounding box parameters as constraints for generating randomized text to overlay onto the cleaned image. For example, given the original length, width and area of the bounding box, the text generator 210 can, based on a font size, determine an approximate number of characters that can fit inside the bounding box. The estimated number of characters do not have to exactly fit within the bounding box, rather within threshold parameters of the bounding box. Consider an example: a bounding box has a length of 10 units, a width of 4 units, and an area of 40 units. The text generator 210 can generate a text that fits a threshold tolerance of the dimensions of the bounding box. The threshold tolerance can include a lower tolerance threshold and a higher tolerance threshold that allow the text generator 210 to generate text that would fit in a new bounding box that is smaller than or greater than the original bounding box. Continuing with the example of above, the lower tolerance threshold can be 2 units for the length and 1 unit for the width and the higher tolerance threshold can be 3 units for the length and 2 units for the width. The text generator 210 can select a font and a font size that can be used to overlay text into a bounding box that has dimensions within the tolerance thresholds. The new dimensions can be within a range of 8 units to 13 units for the length and 3 units to 6 units for the width. The text generator 210 can generate various combinations of characters that fit within the tolerance thresholds. For example, the text generator 210 can generate a line of text with 9 characters that each have a length of 1 unit and width of 5 units. The text generator 210 can also generate a line of text with 11 characters that each have a length of 1 unit and a width of 3 units. The tolerance thresholds can guide the text generator 210 to generate text that may not have the exact dimensions of the original text that was cleaned from the image, but do resemble the original text at, for example, a first glance to a human eye. Therefore, the original table used to generate the cleaned image and the table generated from the cleaned image are similar in visual appearance. As a result, a machine learning model can receive training instances that are visually similar upon which to train.

The text generator 210 can generate randomized text that may or may not include accepted words or terms. The randomized text can be generated by a text generator or retrieved from a corpus. For example, the text of an original image can be "employee A to receive document B." The original image can be cleaned, such that text is removed from the image. The text generator 210 can use the first annotation 206 to determine the dimensions of the bounding box and generate text to fit within tolerance thresholds of the bounding box. The text can be a random string of characters (e.g., "dkr,d,mfig dfdk445dsjd dmg r", or the text can be recognizable words or terms (e.g., "the cookies are in the jar").

The text placement unit 212 can generate code including instructions to overlay the generated text on the cleaned image using a bounding box as a guide as to placement of the text on the cleaned image. For example, the text placement unit 212 can determine a centroid of the bounding box and generate instructions for arranging the generated text around the centroid. The text placement unit 212 can similarly populate each cell of a cleaned version of the first image with table 202. The imager 214 can receive the instructions and generate a second image with table 216.

Once the imager 214 generates a second image with table 216, the annotation generator 220 can determine a second annotation 220 for the second image with table 216, including a description of each generated text and new bounding box for each generated text. The annotation generator 218 can determine a new bounding box around the overlayed generated text. The bounding box can be rectangular and defined by the x- and y-axis coordinates of the upper left-hand corner and lower right-hand corner of the bounding box. The x- and y-axis coordinates of each corner can be based on a coordinate system of the image. For example, each position can be defined by an x and y coordinate of an x- and y-axis coordinate system of the image. The bounding box for the second text can have the same centroid as the bounding box for the first text.

The bounding box parameters and text for each text instance can be associated together generate a new training instance. The template-based training dataset generator 200 can further repeat this process to generate multiple training instances to form a training dataset 222.

Figure 3:
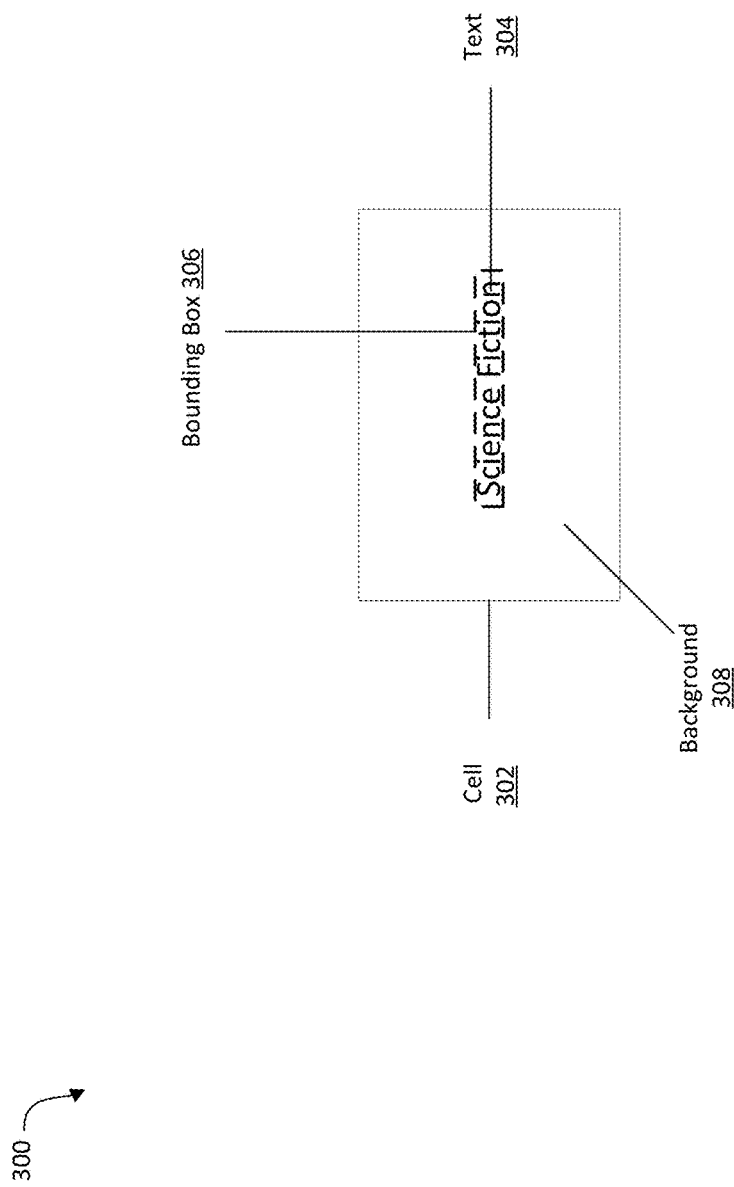
FIG. 3 is an illustration of a cell with text, according to one or more embodiments.
Figure 4:
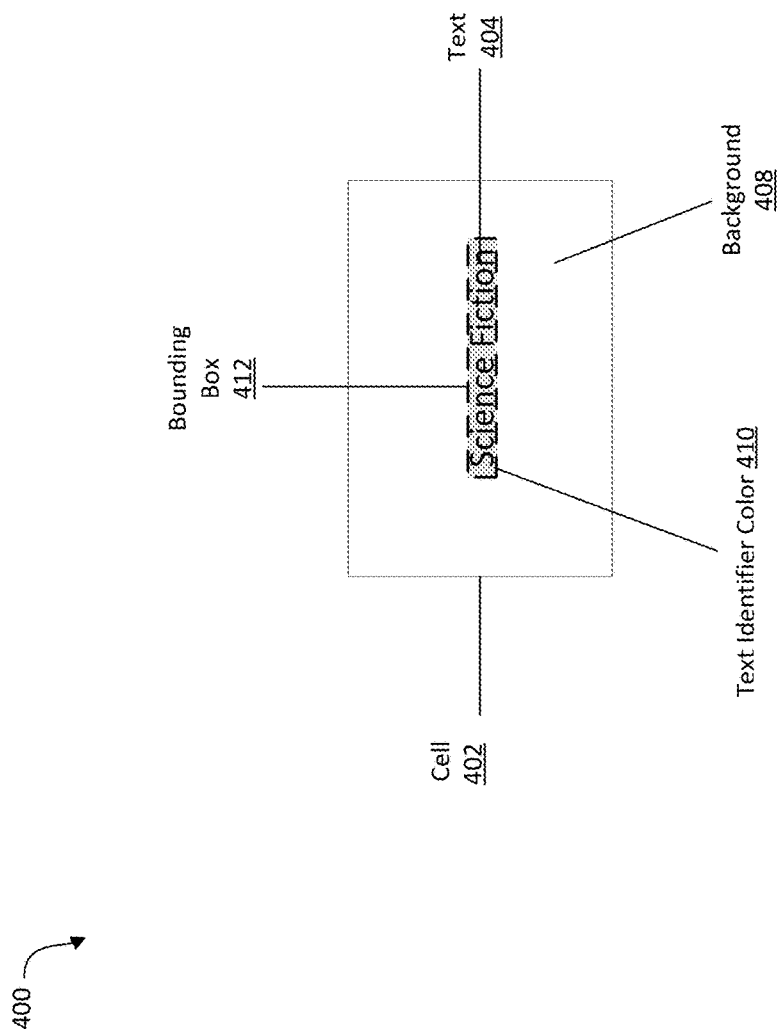
FIG. 4 is an illustration of a cell with text, according to one or more embodiments.
Figure 5:
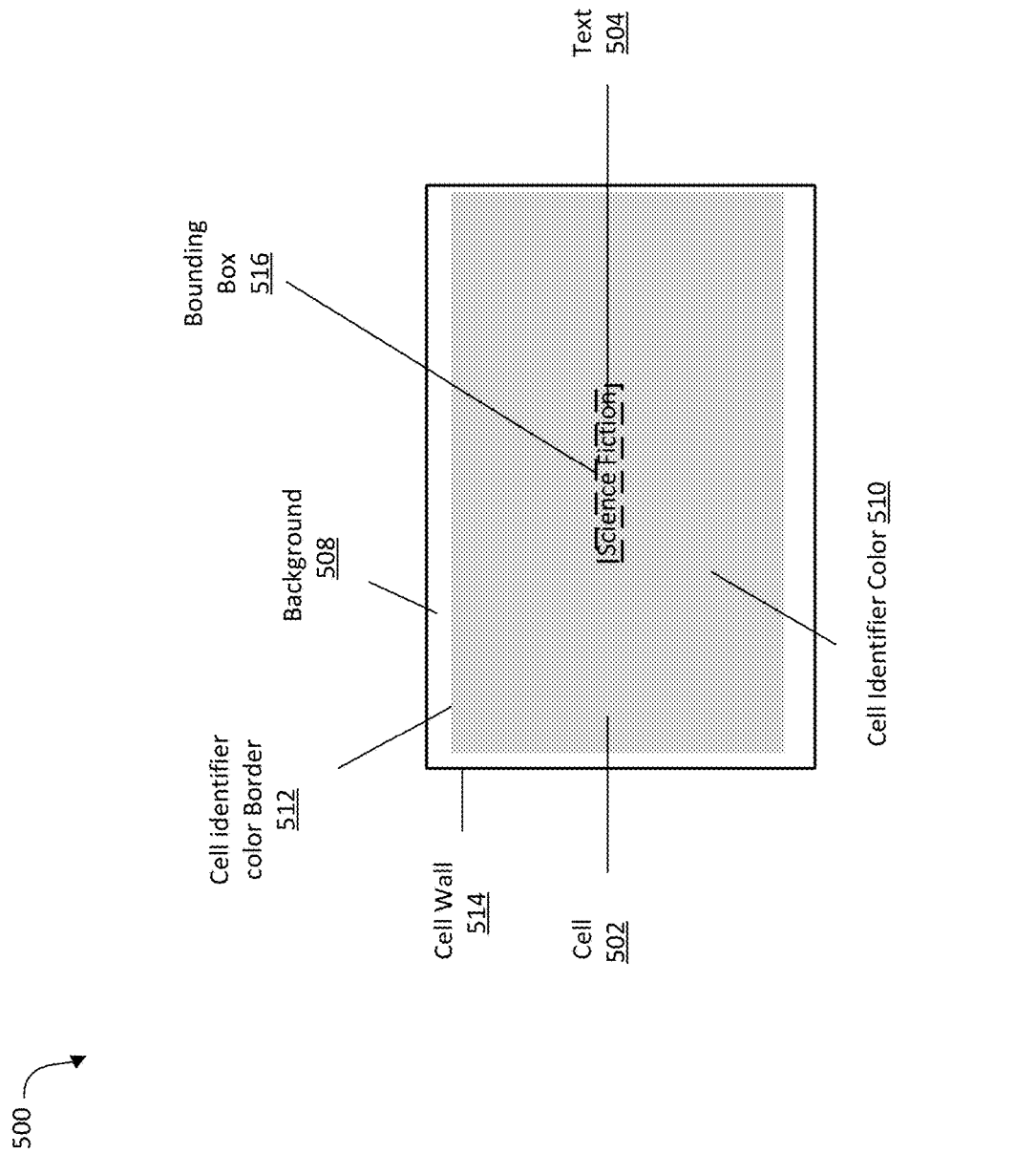
FIG. 5 is an illustration of a cell with text, according to one or more embodiments.

FIGS. 3-5 illustrated variations of coloring for text detection. FIG. 3 is an illustration 300 of a cell table with text, according to one or more embodiments. The cell 302 can be included in an image, such as the image generated by the imager 112 or imager 214. The cell 302 can include text 304 (e.g., "Science Fiction). The text 304 can be displayed in a color (e.g., red, green, blue, black, white) that is distinct from the color of the background 308. For example, as illustrated, the text font can be in a black color and the background 308 can be white. A computing system (e.g., the HTML-based training dataset generator 100) can identify the text 304 using the distinction in color of the text 304 and the background 308 as described above. The computing system can further generate a bounding box 306 to surround the text 304, as described above. The bounding box 304 can be a tight bounding box that closely fits around the text 304.

FIG. 4 is an illustration 400 of a cell table with text, according to one or more embodiments. The cell 402 can be included in an image, such as the image generated by the imager 112 or imager 214. The cell 402 can include text 404 (e.g., "Science Fiction). The text 404 can be displayed in a color that is distinct from the color of the background 408. For example, as illustrated, the text font can be in a black color and the background 408 can be white. In addition, the cell 402 can include a text identifier color 410. The text identifier color 410 and text 404 can appear similar to a highlighted word in a word processing document. In these instances, an object identifier (e.g., the object identifier 116) can access the HTML code to identify the text identifier color 410 (e.g., gray) and the text font color (e.g., black). This approach can be used if a table includes multiple cells with text and all of the text is the same color. Therefore, the object identifier may distinguish different text instances based on the text identifier color 410 rather than the text font color. Once the object identifier detects the text identifier color 410, the object identifier can determine the boundary of the text identifier color 410 similar to determining the boundary of a character, as described above. The object identifier can then use the text font color to detect the text, where the search space of image pixels for the text font color is constrained by the boundary of text identifier color 410. A computing system (e.g., the HTML-based training dataset generator 100) can identify the text 404 using the distinction in color of the text 404 and the text identifier color 410 as described above. The computing system can further generate a bounding box 412 to surround the text 404, as described above. The bounding box 412 can be a tight bounding box that closely fits around the text 404.

FIG. 5 is an illustration 500 of a cell table with text, according to one or more embodiments. The cell 502 can be included in an image, such as the image generated by the imager 112 or imager 214. The cell 502 can include text 504 (e.g., "Science Fiction). The text 504 can be displayed in a color that is distinct from the color of the background 508. For example, as illustrated, the text font can be in a black color and the background 508 can be white. In addition, the cell 502 can include a cell identifier color 510, which can be, for example, gray. For example, the cell identifier color 510 and text 404 can appear similar to a highlighted cell. It should be appreciated that as illustrated, the cell identifier color border 512 does not extend to the cell wall 514, but in other instances, the HTML code can be configured to extend the cell identifier color border 512 to the cell wall 514.

An object identifier (e.g., the object identifier 116) can access the HTML code to identify the cell identifier color 510 (e.g., gray) and the text font color (e.g., black). This approach can be used if a table includes multiple cells with text and all of the text is the same color. Therefore, the object identifier may distinguish different text instances based on the cell identifier color 510 rather than the text font color. Once the object identifier detects the cell identifier color 510, the object identifier can determine the boundary of the cell identifier color 510 similar to determining the boundary a character, as described above. The object identifier can then use the text font color to detect the text, where the search space of image pixels for the text font color is constrained by the boundary of cell identifier color 510. A computing system (e.g., the HTML-based training dataset generator 100) can identify the text 504 using the distinction in the color of the text 504 and the cell identifier color 510 as described above. The computing system can further generate a bounding box 516 to surround the text 504, as described above. The bounding box 516 can be a tight bounding box that closely fits around the text 404.

Figure 6:
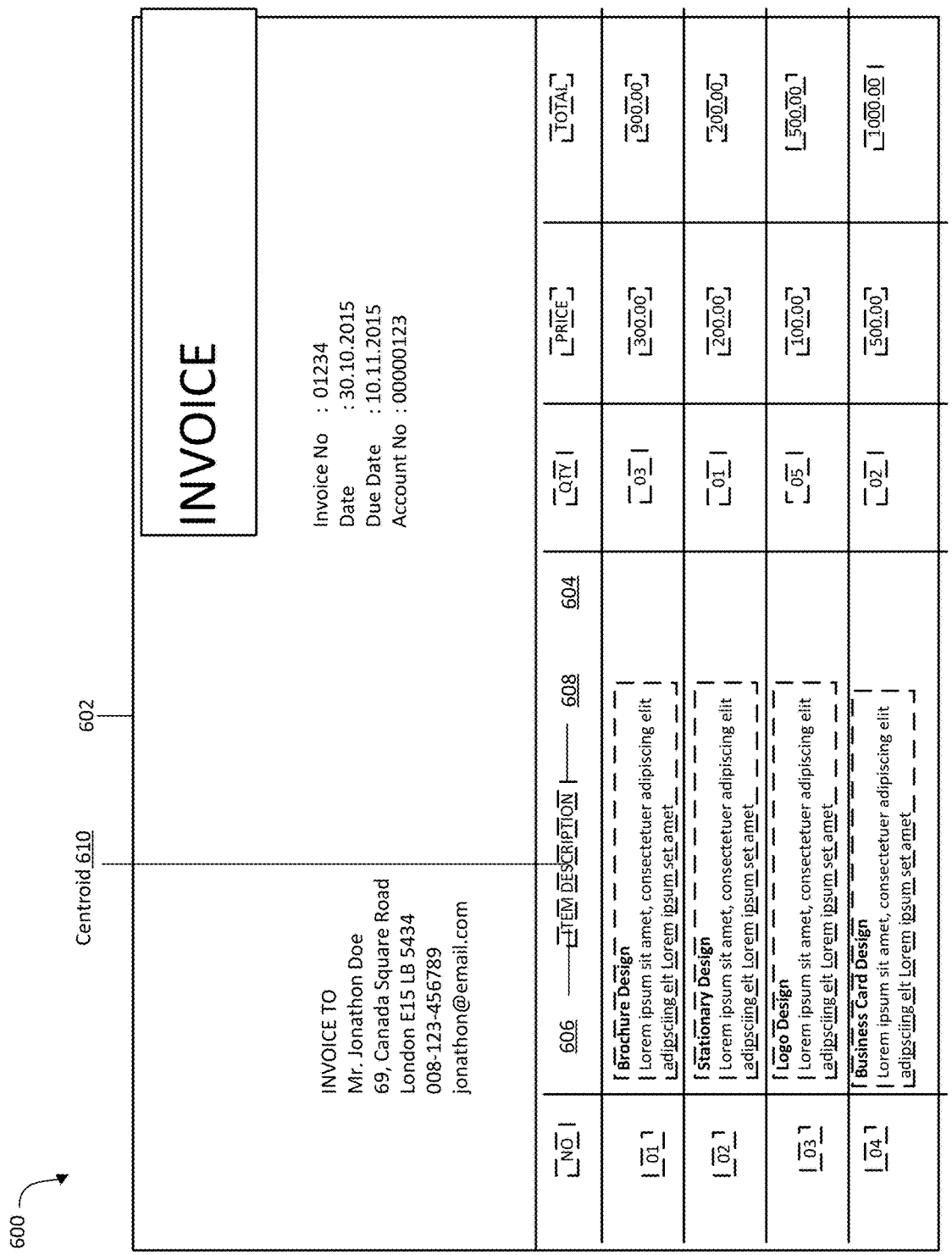
FIG. 6 is an illustration of an annotated image of a table, according to one or more embodiments.
Figure 7:
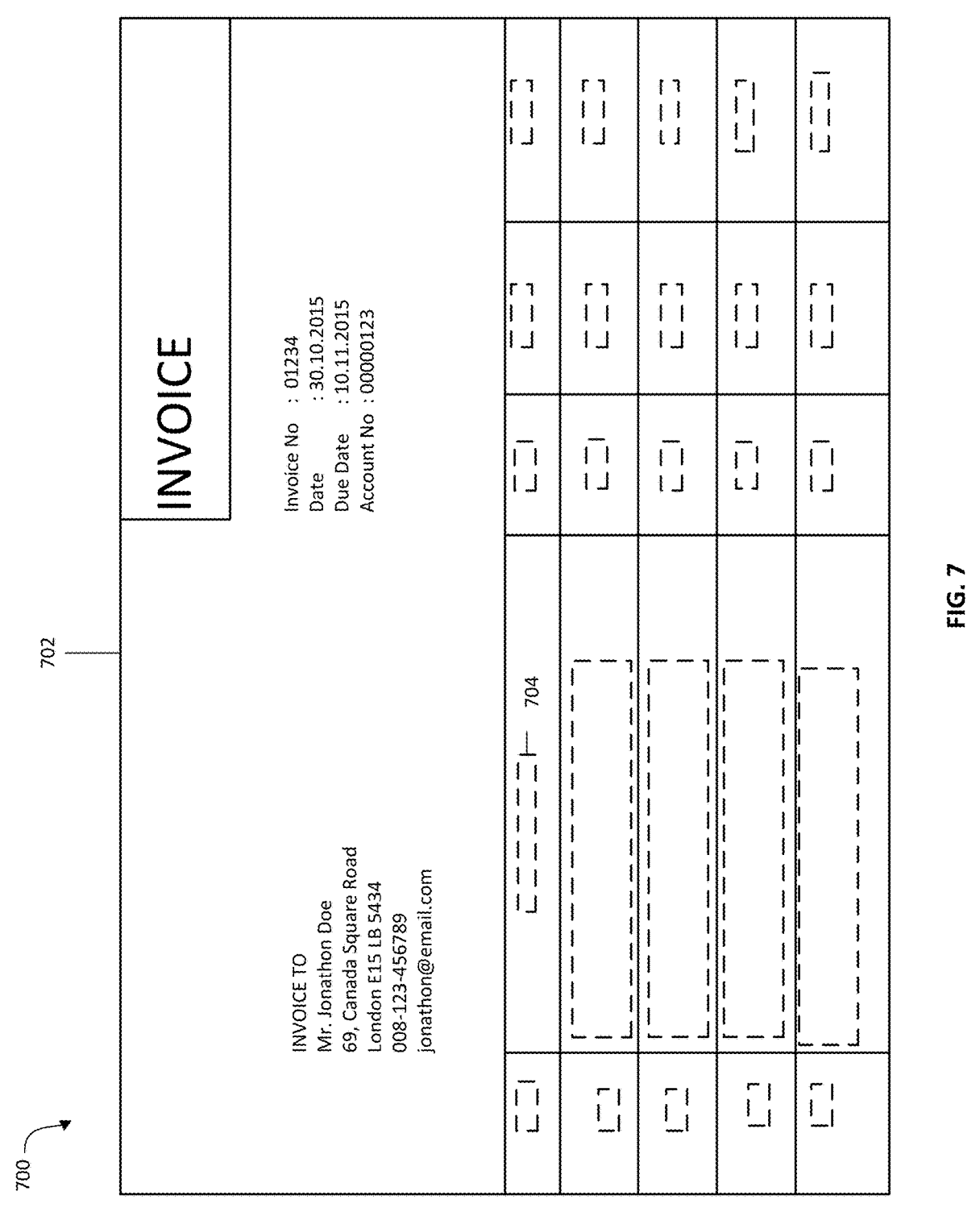

FIGS. 6-8 illustrate a progression of a table image with cells populated with text surrounded by bounding boxes, to a cleaned version of the image, to a version of the image with newly generated text and newly generated bounding boxes.

FIG. 6 is an illustration 600 of an example annotated image of a table, according to one or more embodiments. The image 602 of the invoice includes a name and address of an invoice recipient and invoice document information. As illustrated, the image 602 can further include a twenty-five cell table with five columns and five rows. Each cell can be populated with text. For illustration purposes, consider a cell 604 of the table. The cell 604 can include text 606 (e.g., "ITEM DESCRIPTION"). The text 606 can be surrounded by a bounding box 608. The bounding box 608 is illustrated in dashed lines to indicate that the bounding box lines may not be visible to the human eye. Rather the bounding box 608 can be in the form of metadata that describes a spatial location of the bounding box on the image 602. The bounding box 608 can be a minimum, tight, or smallest bounding box that minimizes the distance between the bounding box 608 and the contained text 606. The bounding box 608 can include a length and a width, which can be used to determine the area of the bounding box. As illustrated, the text 606 is displayed on a background. The text 606 can be displayed in the first color (black) and the background can be displayed in a second color (e.g., white). An annotation can include the parameters of the bounding box 608 and the text 606. As illustrated, twenty-five cells of the table are populated with text. Therefore, the image 602 can include twenty-five annotation instances.

FIG. 7 is an illustration 700 of an example cleaned image of the table, according to one or more embodiments. An image 702 of an invoice (e.g., the invoice of FIG. 6) with vacant cells is illustrated as an example annotated image with a table. Each cell of the invoice is vacant. As illustrated, each bounding box from FIG. 6 is illustrated on the invoice to indicate that the cleaned image and annotation include the bounding boxes from the original image. FIG. 7 differs from FIG. 6, in that the image 702 has been processed to remove the text from each bounding box, but the bounding boxes remain. It should be appreciated that each bounding box retains its respective dimensions even after removal of the text from the image. For example, the bounding box 704 can be the same as the bounding box 608 of FIG. 6.

FIG. 8 is an illustration 800 of an example image with generated text and generated bounding boxes, according to one or more embodiments. An image 802 of an invoice (e.g., the invoice of FIG. 6) with a portion of cells being vacant is illustrated as an example annotated image with a table. Referring to a cell 804 (e.g., the cell 604 of FIG. 6), it can be seen that a computing device has generated a new text 806 to populate the cell 804. The original text 606 included, "ITEM DESCRIPTION", while the new text 806 includes "FmkFNSKF FJSLI GFDGHHlmf." As indicated above, the computing device can use the parameters of the original bounding box 608 to guide the generation of the new text 806 and the placement of the new text 806 in the cell 804. For example, the computing device can use the length and the width of the original bounding box 608 to determine an area of the original bounding box 608. The computing device can further use a lower tolerance threshold and a higher tolerance threshold to determine a range of bounding box dimensions in which to fit the new text 806. The computing device can use the range of bounding box dimensions to determine the parameters of the new text 806, including a number of characters, a font, and a font size.

The computing device can further use the position of the original bounding box 608 as a guide as to a position of the new text 806 on the image 802. For example, the computing device can determine a centroid 610 of the original bounding box 608 and overlay the new text 806 in relation to the centroid. In other words, the new text 806 is positioned such a centroid of a bounding box surround the new text is positioned the same as the centroid 610 of the original bounding box 608. In this sense, the new text 806 is displayed in the cell 804 without overlapping the boundaries of the cell 804.

The computing device can determine a new bounding box 808 to surround the new text 706. For the HTML-based image generation, a computing device used a color distinction to identify the positioning of the text. In the template-based image generation, the computing device positioned the new text 706 on the image, and therefore includes the position of the text. The computing device can generate a new annotation that includes bounding box parameters (e.g., position, length, width). The annotation can further include the new text 806 surrounded by the new bounding box 808.

Figure 9:
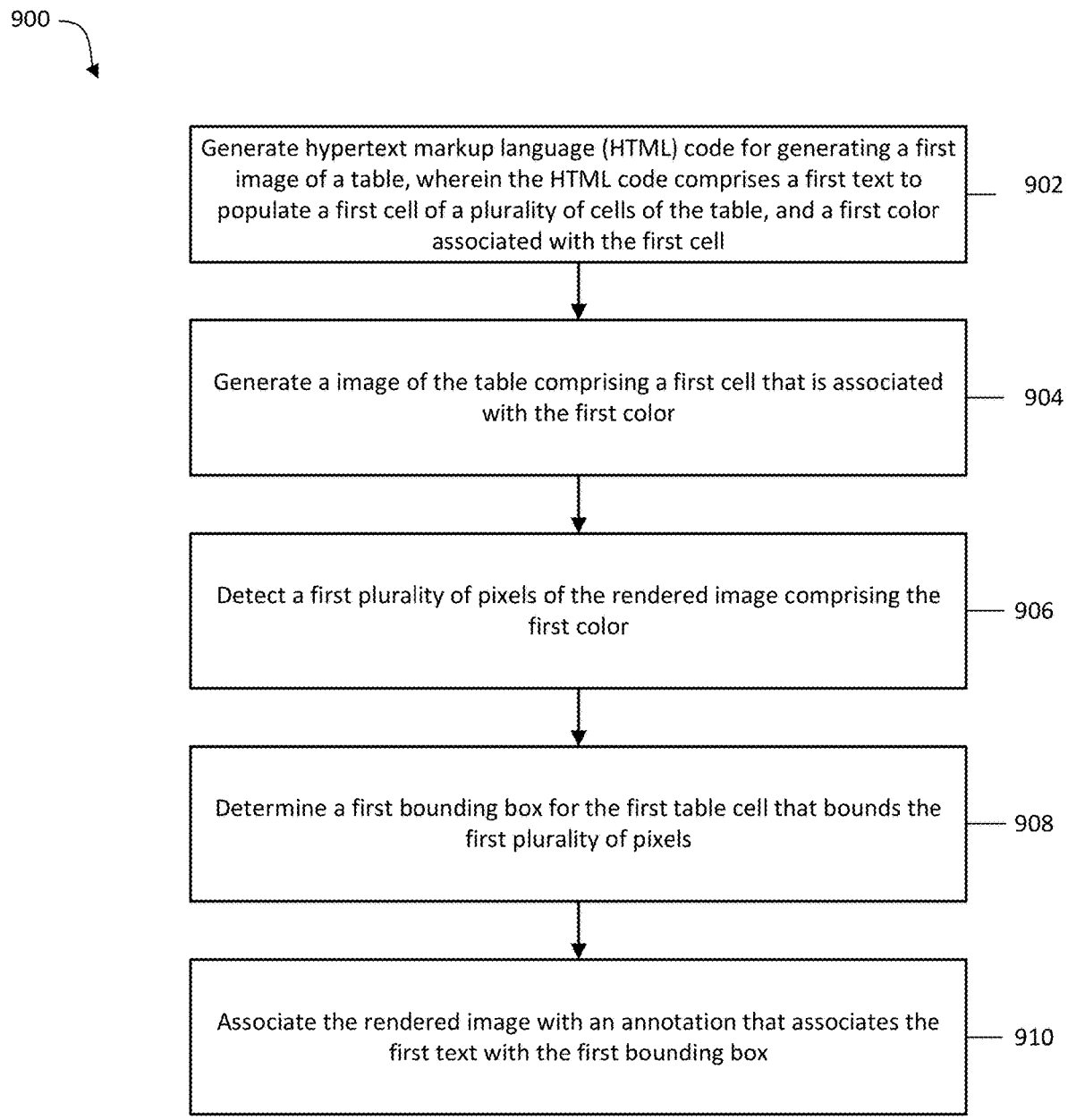
FIG. 9 is a process flow for HTML-based image generation, according to one or more embodiments.

FIG. 9 is a process flow 900 for HTML-based image generation, according to one or more embodiments. While the operations of processes 800, 900, and 1000 are described as being performed by generic computers, any suitable device (e.g., a cloud provider server) may be used to perform one or more operations of these processes. Processes 800, 900, and 1000 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 902, the method can include a computing system (e.g., the HTML-based training dataset generator 100) generating HTML code for a table comprising a set of rows and columns. The HTML code can include a first text to populate a first cell of a plurality of cells of the table, and a first color (e.g., red, green, blue, black, white) associated with the first cell.

At 904, the method can include the computing system generating a first image (e.g., .png, .jpg) of the table using the HTML code. The first cell can be populated with the first text.

At 906, the method can include the computing device detecting a first plurality of pixels of the first image comprising the first color. For example, the computing system can determine which colors were used for the text by accessing the HTML code. The computing system can further use color filters to detect each of the image pixels associated with each of the color.

At 908, the method can include the computing device determining a first bounding box for the first cell that bounds the first plurality of pixels based at least in part on the first color. For example, the computing system can determine first spatial coordinates for the first plurality of pixels on the first image. The computing system can determine second spatial coordinates for the first bounding box based at least in part on the first spatial coordinates for the first plurality of pixels. In another example, the computing system can detect a second plurality of pixels of the first image comprising a second color. The computing system can determine that the second plurality of pixels is associated with a background of the first cell based at least in part on the HTML code. The computing system can determine first spatial coordinates of a border of the second plurality of pixels based at least in part on the HTML code. The computing system can determine second spatial coordinates for the first bounding box based at least in part on the first spatial coordinates of the border.

At 910, the method can include the computing system associating the first image with a first annotation that associates the first text with the first bounding box. For example, the computing system can determine that the first plurality of pixels is associated with the first color. The computing system can determine that the first color is associated the first text based at least in part on the HTML code. The computing system can generate the first annotation that associates the first text the first bounding box based at least in part on determining that the first color is associated with the first text.

Figure 10:
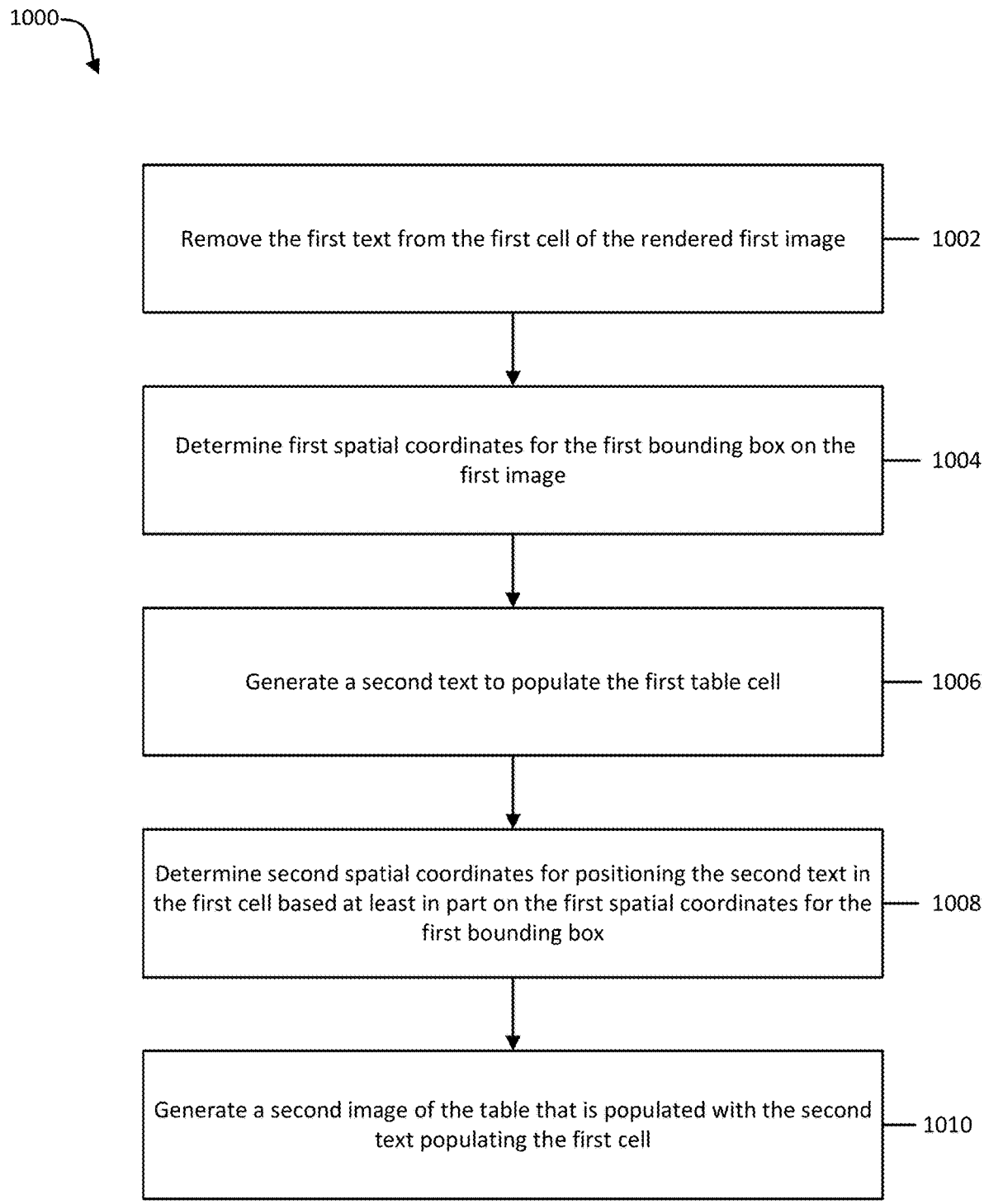
FIG. 10 is a process flow for template-based image generation, according to one or more embodiments.

FIG. 10 is a process flow 1000 for template-based image generation, according to one or more embodiments. At 1002, the method can include the computing system (e.g., the template-based training dataset generator 200) removing the first text from the first cell of the first image.

At 1004, the method can include the computing device determining first spatial coordinates for the first bounding box on the first image. For example, the computing system can access the HTML code, and based on the HTML code determine the first spatial coordinates for the first bounding box.

At 1006, the method can include the computing system generating a second text to populate the first cell, wherein the second text is distinct from the first text. The computing system can use a random text generator to generate the second text.

At 1008, the method can include the computing device determining second spatial coordinates for positioning the second text in the first cell based at least in part on the first spatial coordinates for the first bounding box. The second spatial coordinates may or may not be the same as the first spatial coordinates based on the dimensions of the second text.

At 1010, the method can include the computing system generating a second image of the table that is populated with the second text populating the first cell. The second text can be positioned in the first cell based at least in part on the second spatial coordinates.

Figure 11:
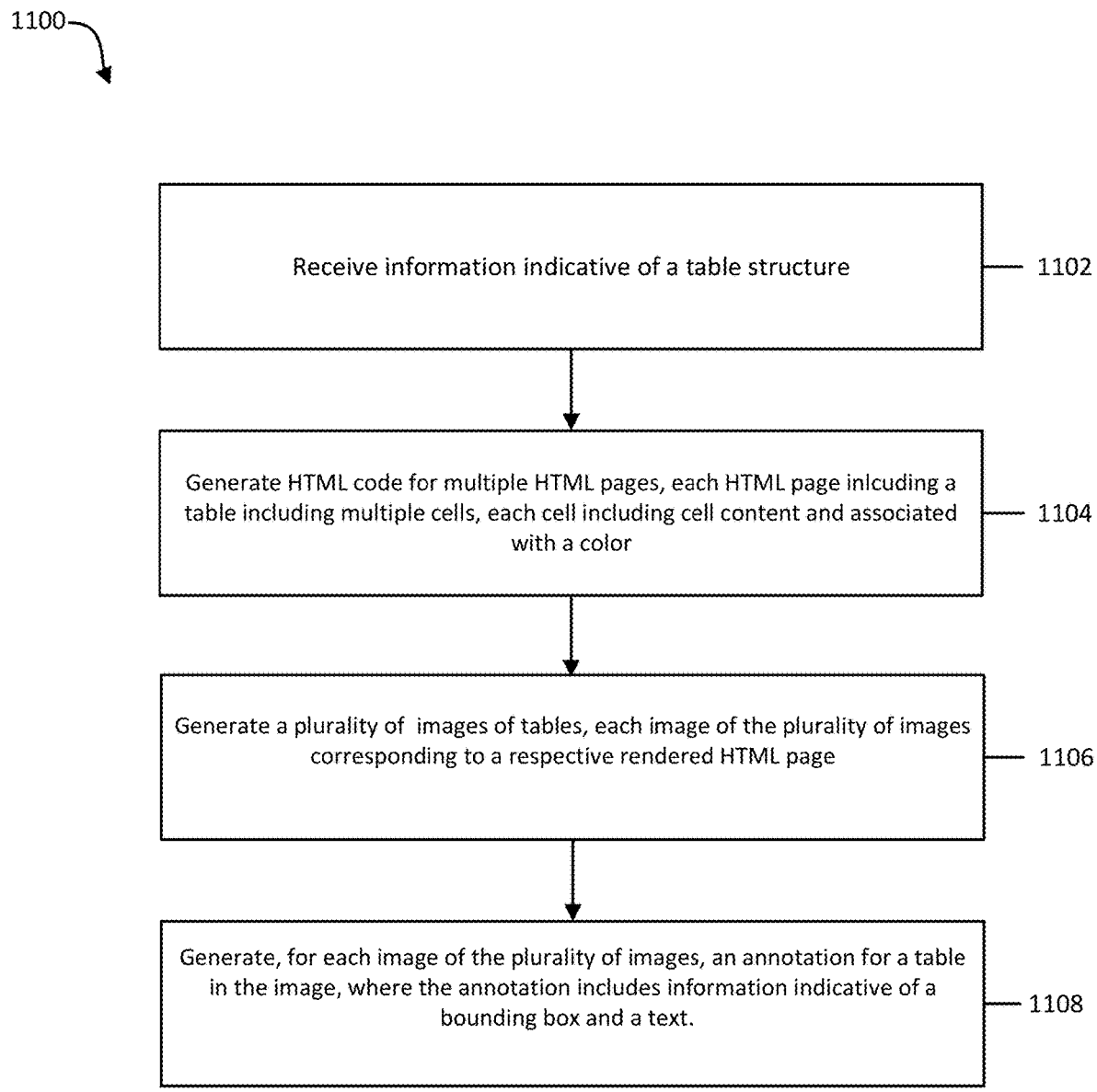
FIG. 11 is a process flow for HTML-based image generation, according to one or more embodiments.

FIG. 11 is a process flow 1100 for HTML-based image generation, according to one or more embodiments. At 1102, a method can include a computing system (e.g., the HTML-based training dataset generator 100) receiving information indicative of a table structure. The information can include, for example, a number of columns and rows, and a size of each cell of the table. The information can further be for multiple tables, in which each table has different numbers of rows and columns.

At 1104, the method can include the computing system generating HTML code for multiple HTML pages, each HTML page can include a table with multiple cells. Each cell can include cell content, such as text. Each cell can further be associated with a color.

At 1106, the method can include the computing system generating the multiple HTML pages using the HTML code. Each image can include an image of a table with different numbers of columns and rows. Each table can further include different text instances populating the cells of each table.

At 1108, the method can include the generating, for each image, an annotation for a table in an image includes information indicative of a bounding box surrounding a text populating a cell, and the text. The annotation information can include spatial parameters of the bounding box, and also include text parameters, such as font, font size, characters, and effects. The result being a diverse dataset of training data for a machine learning model As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
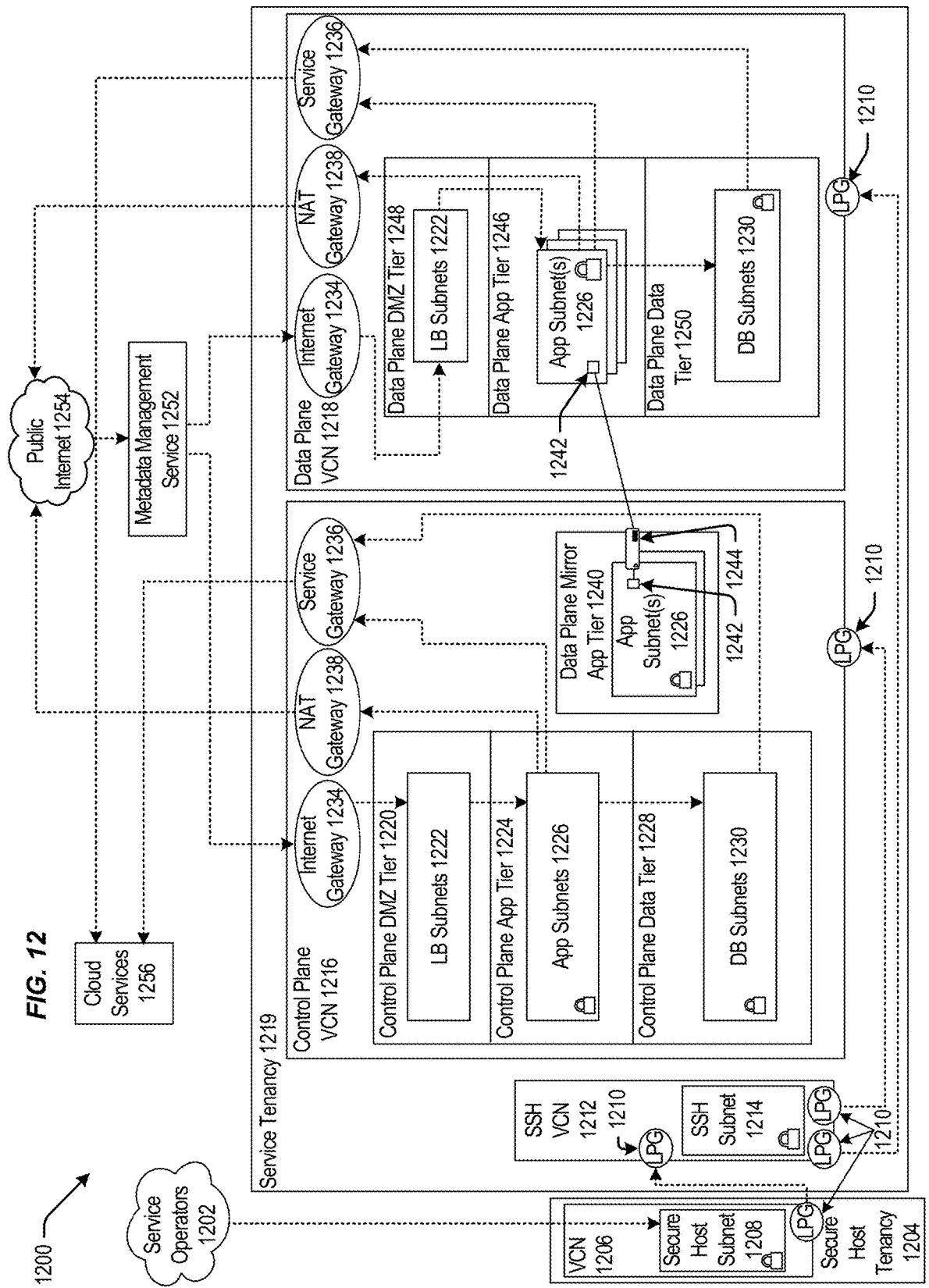
FIG. 12 is a block diagram illustrating one pattern for implementing a cloud infrastructure as a service system, according to one or more embodiments.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively coupled to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Metadata that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
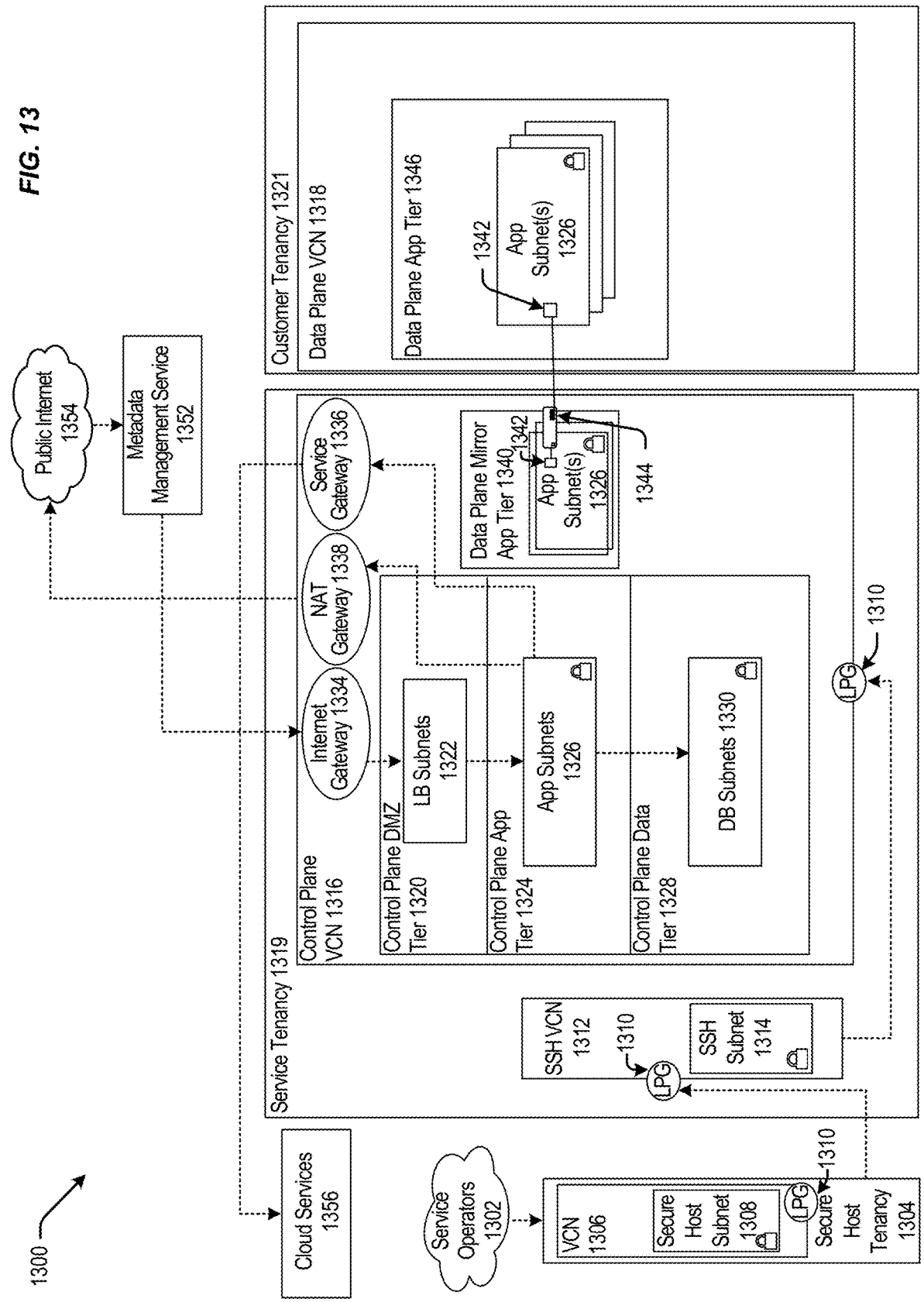
FIG. 13 is a block diagram illustrating another pattern for implementing a cloud infrastructure as a service system, according to one or more embodiments.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1306 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1210 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s) 1222 of FIG. 12), a control plane app tier 1324 (e.g., the control plane app tier 1224 of FIG. 12) that can include app subnet(s) 1326 (e.g., app subnet(s) 1226 of FIG. 12), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336

(e.g., the service gateway 1236 of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1246 of FIG. 12) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1252 of FIG. 12) that can be communicatively coupled to public Internet 1354 (e.g., public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
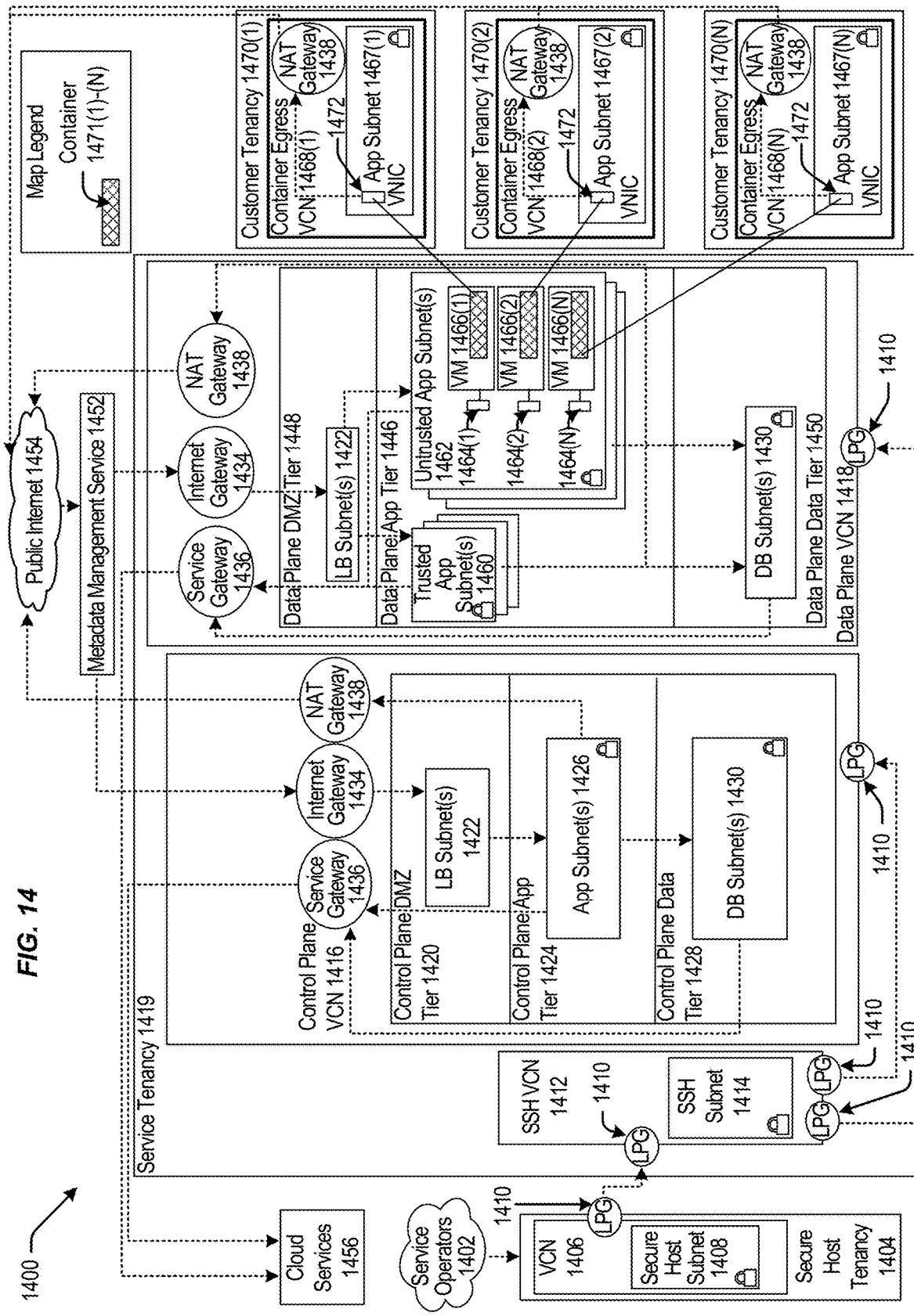
FIG. 14 is a block diagram illustrating another pattern for implementing a cloud infrastructure as a service system, according to one or more embodiments.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1206 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422 (e.g., LB subnet(s) 1222 of FIG. 12), a control plane app tier 1424 (e.g., the control plane app tier 1224 of FIG. 12) that can include app subnet(s) 1426 (e.g., similar to app subnet(s) 1226 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12).

The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively coupled to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
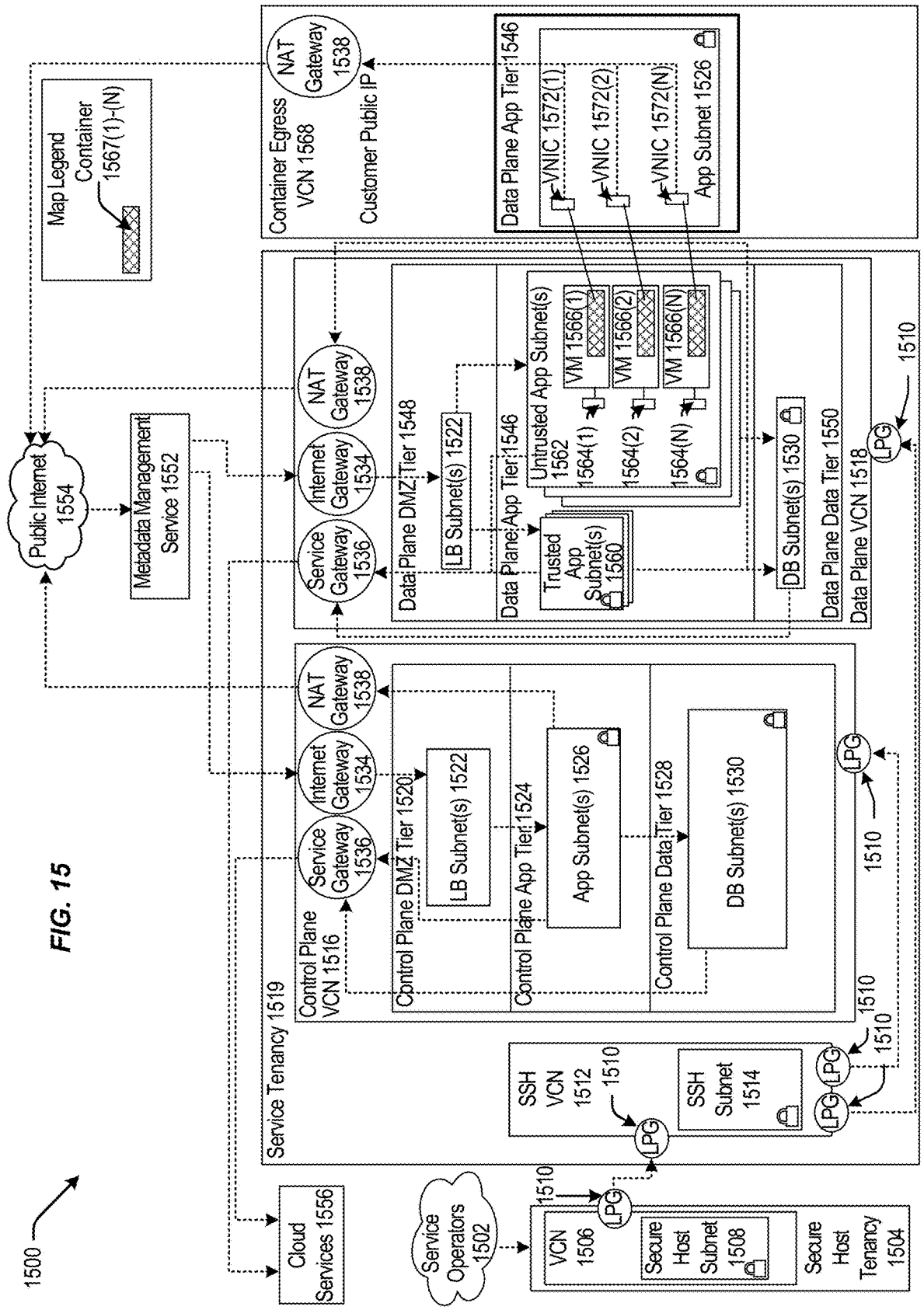
FIG. 15 is a block diagram illustrating another pattern for implementing a cloud infrastructure as a service system, according to one or more embodiments.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s) 1222 of FIG. 12), a control plane app tier 1524 (e.g., the control plane app tier 1224 of FIG. 12) that can include app subnet(s) 1526 (e.g., app subnet(s) 1226 of FIG. 12), a control plane data tier 1528 (e.g., the control plane data tier 1228 of FIG. 12) that can include DB subnet(s) 1530 (e.g., DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 12) and a network address translation (NAT) gateway 1538 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet 1254 of FIG. 12).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively coupled to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
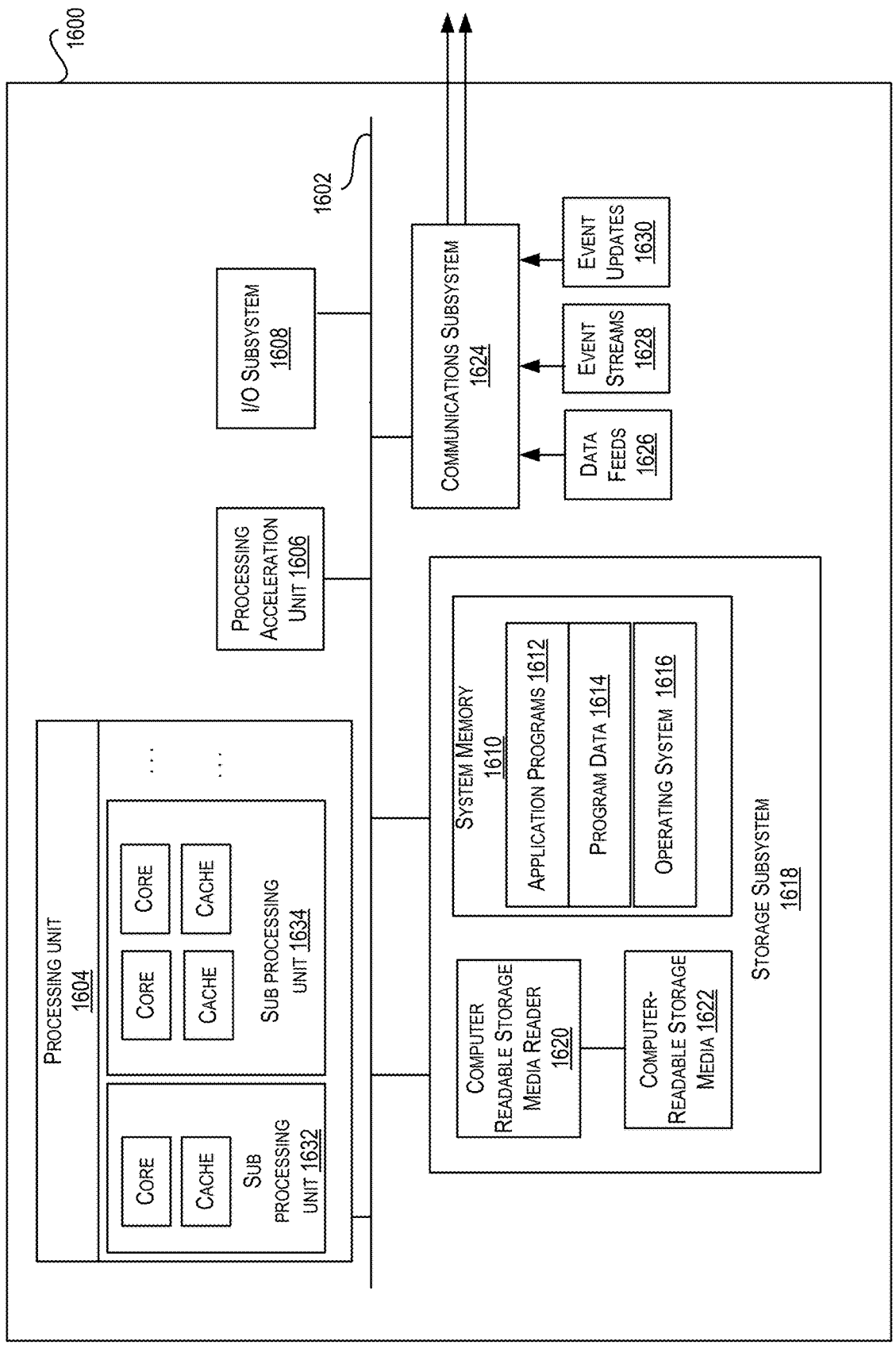
FIG. 16 is a block diagram illustrating an example computer system, according to one or more embodiments.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1618 may also provide a tangible computer-readable storage medium for storing the basic programming and data constructs that provide the functionality of some embodiments. Software (programs, code services, instructions) that when executed by a processor provide the functionality described above may be stored in storage subsystem 1618. These software services or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
generating, by a computing system, hypertext markup language (HTML) code for generating a first image of a table, wherein the HTML code comprises a first text to populate a first cell of a plurality of cells of the table, and a first color associated with the first cell;
generating, by the computing system, the first image of the table comprising the first cell that is rendered using the first color, the first cell populated with the first text;
detecting, by the computing system, a first plurality of pixels of the first image comprising the first color;
determining that the first plurality of pixels is associated with the first color;
determining that the first color is associated with the first text based at least in part on the HTML code;
determining, by the computing system, a first bounding box for the first cell that bounds the first plurality of pixels based at least in part on the first color;
generating a first annotation that associates the first text with the first bounding box based at least in part on determining that the first color is associated with the first text; and
associating, by the computing system, the first image with the first annotation that associates the first text with the first bounding box.

2. The method of claim 1, wherein determining that the first plurality of pixels is associated with the first color comprises using a color filter.

3. The method of claim 1, wherein the method further comprises:
detecting a second plurality of pixels of the first image comprising a second color;
determining that the second plurality of pixels is associated with a background of the first cell based at least in part on the HTML code;
determining a border of the second plurality of pixels based at least in part on the HTML code; and
determining a search space for detecting the first plurality of pixels based at least in part on the border, wherein the first plurality of pixels is within the border.

4. The method of claim 1, wherein the HTML code comprises a second text to populate a second cell of the plurality of cells of the table, and a second color associated with the second cell, wherein the second color is distinct from the first color, and wherein the method further comprises:
detecting a second plurality of pixels of the first image comprising the second color;
determining a second bounding box for the second cell that bounds the second plurality of pixels; and associating the first image with a second annotation that associates the second text with the second bounding box.

5. The method of claim 1, wherein determining the first bounding box for the first cell comprises:
determining first spatial coordinates for the first plurality of pixels on the first image; and
determining second spatial coordinates for the first bounding box based at least in part on the first spatial coordinates for the first plurality of pixels.

6. The method of claim 1, wherein determining the first bounding box for the first cell comprises:
detecting a second plurality of pixels of the first image comprising a second color;
determining that the second plurality of pixels is associated with a background of the first cell based at least in part on the HTML code;
determining first spatial coordinates of a border of the second plurality of pixels based at least in part on the HTML code; and
determining second spatial coordinates for the first bounding box based at least in part on the first spatial coordinates of the border.

7. The method of claim 1, wherein the method further comprises:
determining first spatial coordinates for the first bounding box on the first image;
generating a second text to populate the first cell, wherein the second text is distinct from the first text;
determining second spatial coordinates for positioning the second text in the first cell based at least in part on the first spatial coordinates for the first bounding box; and
generating a second image of the table that is populated with the second text populating the first cell, wherein the second text is positioned in the first cell based at least in part on the second spatial coordinates.

8. The method of claim 7, wherein generating the second text to populate the first cell comprises:
determining dimensions for the first bounding box based at least in part on the first spatial coordinates;
selecting a second text parameter based at least in part on the dimensions, wherein the second text parameter includes one of a font, a font size, and an effect.

9. The method of claim 7, wherein determining first spatial coordinates for the first bounding box on the first image comprises determining a centroid of the first bounding box, wherein determining the second spatial coordinates for positioning the second text in the first cell is based at least in part on the centroid.

10. The method of claim 7, wherein the method further comprises:
determining a second bounding box for the first cell that bounds the second text; and
associating the second image with a second annotation that associates the second text with the second bounding box.

11. A computing system, comprising:
one or more processors; and
one or more computer-readable media including instructions that, when executed by the one or more processors, cause the computing system to:
generate hypertext markup language (HTML) code for generating a first image of a table, wherein the HTML code comprises a first text to populate a first cell of a plurality of cells of the table, and a first color associated with the first cell;
generate the first image of the table comprising the first cell that is rendered using the first color, the first cell populated with the first text;
detect a first plurality of pixels of the first image comprising the first color;
determine that the first plurality of pixels is associated with the first color;
determine that the first color is associated with the first text based at least in part on the HTML code;
determine a first bounding box for the first cell that bounds the first plurality of pixels based at least in part on the first color;
generate a first annotation that associates the first text with the first bounding box based at least in part on determining that the first color is associated with the first text;
associate the first image with the first annotation that associates the first text with the first bounding box.

12. The computing system of claim 11, wherein determining that the first plurality of pixels is associated with the first color comprises using a color filter.

13. The computing system of claim 11, wherein the instructions that, when executed by the one or more processors, further cause the computing system to:
detect a second plurality of pixels of the first image comprising a second color;
determine that the second plurality of pixels is associated with a background of the first cell based at least in part on the HTML code;
determine a border of the second plurality of pixels based at least in part on the HTML code; and
determine a search space for detecting the first plurality of pixels based at least in part on the border, wherein the first plurality of pixels is within the border.

14. The computing system of claim 11, wherein the HTML code comprises a second text to populate a second cell of the plurality of cells of the table, and a second color associated with the second cell, wherein the second color is distinct from the first color, and wherein the instructions that, when executed by the one or more processors, further cause the computing system to:
detect a second plurality of pixels of the first image comprising the second color;
determine a second bounding box for the second cell that bounds the second plurality of pixels; and
associate the first image with a second annotation that associates the second text with the second bounding box.

15. The computing system of claim 11, wherein determining the first bounding box for the first cell comprises:
determining first spatial coordinates for the first plurality of pixels on the first image; and
determining second spatial coordinates for the first bounding box based at least in part on the first spatial coordinates for the first plurality of pixels.

16. The computing system of claim 11, wherein determining the first bounding box for the first cell comprises:
detecting a second plurality of pixels of the first image comprising a second color;
determining that the second plurality of pixels is associated with a background of the first cell based at least in part on the HTML code;
determining first spatial coordinates of a border of the second plurality of pixels based at least in part on the HTML code; and determining second spatial coordinates for the first bounding box based at least in part on the first spatial coordinates of the border.

17. One or more non-transitory computer-readable media including stored thereon a sequence of instructions that, when executed by one or more processors, cause a computing system to:

generate hypertext markup language (HTML) code for generating a first image of a table, wherein the HTML code comprises a first text to populate a first cell of a plurality of cells of the table, and a first color associated with the first cell;

generate the first image of the table comprising the first cell that is rendered using the first color, the first cell populated with the first text;

detect a first plurality of pixels of the first image comprising the first color;

determine that the first plurality of pixels is associated with the first color;

determine that the first color is associated with the first text based at least in part on the HTML code;

determine a first bounding box for the first cell that bounds the first plurality of pixels based at least in part on the first color;

generate a first annotation that associates the first text with the first bounding box based at least in part on determining that the first color is associated with the first text; and associate the first image with the first annotation that associates the first text with the first bounding box.

18. The one or more non-transitory computer-readable media of claim 17, wherein determining that the first plurality of pixels is associated with the first color comprises using a color filter.

19. The one or more non-transitory computer-readable media of claim 17, wherein the instructions that, when executed by the one or more processors, further cause the computing system to:

detect a second plurality of pixels of the first image comprising a second color;

determine that the second plurality of pixels is associated with a background of the first cell based at least in part on the HTML code;

determine a border of the second plurality of pixels based at least in part on the HTML code; and determine a search space for detecting the first plurality of pixels based at least in part on the border, wherein the first plurality of pixels is within the border.

20. The one or more non-transitory computer-readable media of claim 17, wherein the HTML code comprises a second text to populate a second cell of the plurality of cells of the table, and a second color associated with the second cell, wherein the second color is distinct from the first color, and wherein the instructions that, when executed by the one or more processors, further cause the computing system to:

detect a second plurality of pixels of the first image comprising the second color;

determine a second bounding box for the second cell that bounds the second plurality of pixels; and associate the first image with a second annotation that associates the second text with the second bounding box.

* * * * *